United States Patent
Nihei

(10) Patent No.: US 9,903,714 B2
(45) Date of Patent: Feb. 27, 2018

(54) NORMAL-LINE DETECTION DEVICE, PROCESSING DEVICE, AND NORMAL-LINE DETECTION METHOD

(71) Applicant: MITSUBISHI HEAVY INDUSTRIES, LTD., Minato-ku, Tokyo (JP)

(72) Inventor: Tomohiro Nihei, Tokyo (JP)

(73) Assignee: MITSUBISHI HEAVY INDUSTRIES. LTD., Tokyo (JP)

( * ) Notice: Subject to any disclaimer, the term of this patent is extended or adjusted under 35 U.S.C. 154(b) by 300 days.

(21) Appl. No.: 14/761,628

(22) PCT Filed: Jan. 10, 2014

(86) PCT No.: PCT/JP2014/050281
§ 371 (c)(1),
(2) Date: Jul. 17, 2015

(87) PCT Pub. No.: WO2014/112431
PCT Pub. Date: Jul. 24, 2014

(65) Prior Publication Data
US 2015/0354950 A1 Dec. 10, 2015

(30) Foreign Application Priority Data
Jan. 18, 2013 (JP) ................................. 2013-007784

(51) Int. Cl.
*G01B 21/20* (2006.01)
*B23B 49/00* (2006.01)
(Continued)

(52) U.S. Cl.
CPC ............ *G01B 21/20* (2013.01); *B21J 15/142* (2013.01); *B21J 15/28* (2013.01); *B23B 49/00* (2013.01);
(Continued)

(58) Field of Classification Search
CPC .... G01B 21/20; G01B 11/245; G01B 11/255; B23B 49/00
See application file for complete search history.

(56) References Cited

U.S. PATENT DOCUMENTS 5,343,402 A * 8/1994 Matsuura ............. B23Q 35/128
318/577
7,200,516 B1 4/2007 Cowley
(Continued)

FOREIGN PATENT DOCUMENTS

CN 101154102 A 4/2008
CN 101408412 A 4/2009
(Continued)

OTHER PUBLICATIONS

Mahine Translation of CN 102411336 A, Guo et al., Apr. 2012, 19 pages.*
(Continued)

*Primary Examiner* — Evan Pert
(74) *Attorney, Agent, or Firm* — Kanesaka Berner and Partners LLP

(57) ABSTRACT

A normal-line detection device is provided with: four or more non-contacting distance sensors for measuring the distance to a processing surface of a work piece, the non-contacting distance sensors being arranged on the periphery of a drill body, in an arrangement plane orthogonal to an axis line of the drill body, and a distance measurement axis of each non-contacting distance sensor and the axis line intersecting; and a PC for calculating an approximation surface of a processing surface on the basis of measurement values from the non-contacting distance sensors and the angle of the non-contacting distance sensors with respect to the axis line, and determining the normal-line of the approximation surface as the normal-line of the processing surface.

7 Claims, 9 Drawing Sheets

(51) Int. Cl.
　　　*G01B 11/255*　　(2006.01)
　　　*G01B 11/02*　　(2006.01)
　　　*G01B 11/245*　　(2006.01)
　　　*B25H 1/00*　　(2006.01)
　　　*B21J 15/14*　　(2006.01)
　　　*B21J 15/28*　　(2006.01)

(52) U.S. Cl.
　　　CPC ......... *B25H 1/0078* (2013.01); *G01B 11/026* (2013.01); *G01B 11/245* (2013.01); *G01B 11/255* (2013.01)

(56) References Cited

U.S. PATENT DOCUMENTS

| | | | |
|---|---|---|---|
| 7,331,113 | B1 | 2/2008 | Patrick et al. |
| 2002/0129504 | A1 | 9/2002 | Lysen |
| 2006/0104734 | A1* | 5/2006 | Mathis ................ B23B 39/04 408/236 |
| 2006/0236515 | A1 | 10/2006 | Kurt et al. |
| 2010/0290909 | A1 | 11/2010 | Greciet et al. |
| 2011/0320031 | A1* | 12/2011 | Cornelius ............. B23Q 1/32 700/174 |
| 2013/0226513 | A1* | 8/2013 | Fujita .................. G06F 17/16 702/151 |
| 2014/0135989 | A1* | 5/2014 | Melikian .............. G01B 11/14 700/259 |
| 2016/0288214 | A1* | 10/2016 | Ishihara ................ B23B 5/36 |

FOREIGN PATENT DOCUMENTS

| | | | | |
|---|---|---|---|---|
| CN | 102411336 A | * | 4/2012 | ........... G05B 19/401 |
| JP | 62-191710 A | | 8/1987 | |
| JP | 3-57910 A | | 3/1991 | |
| JP | 03057910 A | * | 3/1991 | ............. G01B 21/20 |
| JP | 8-71823 A | | 3/1996 | |
| JP | 2008-51611 A | | 3/2008 | |
| JP | 2011-99958 A | | 5/2011 | |
| JP | 2012-135871 A | | 7/2012 | |
| JP | 2013-167508 A | | 8/2013 | |
| JP | 2013-181758 A | | 9/2013 | |

OTHER PUBLICATIONS

Decision to Grant a Patent in JP Application No. 2013-007784, dated Aug. 9, 2016.

Extended European Search Report in EP Application No. 14740389.3, dated Jul. 22, 2016.

Office Action in CN Application No. 201480005203.8, dated Jan. 11, 2017.

International Search Report and Written Opinion dated Apr. 15, 2014 in International Application No. PCT/JP2014/050281.

\* cited by examiner

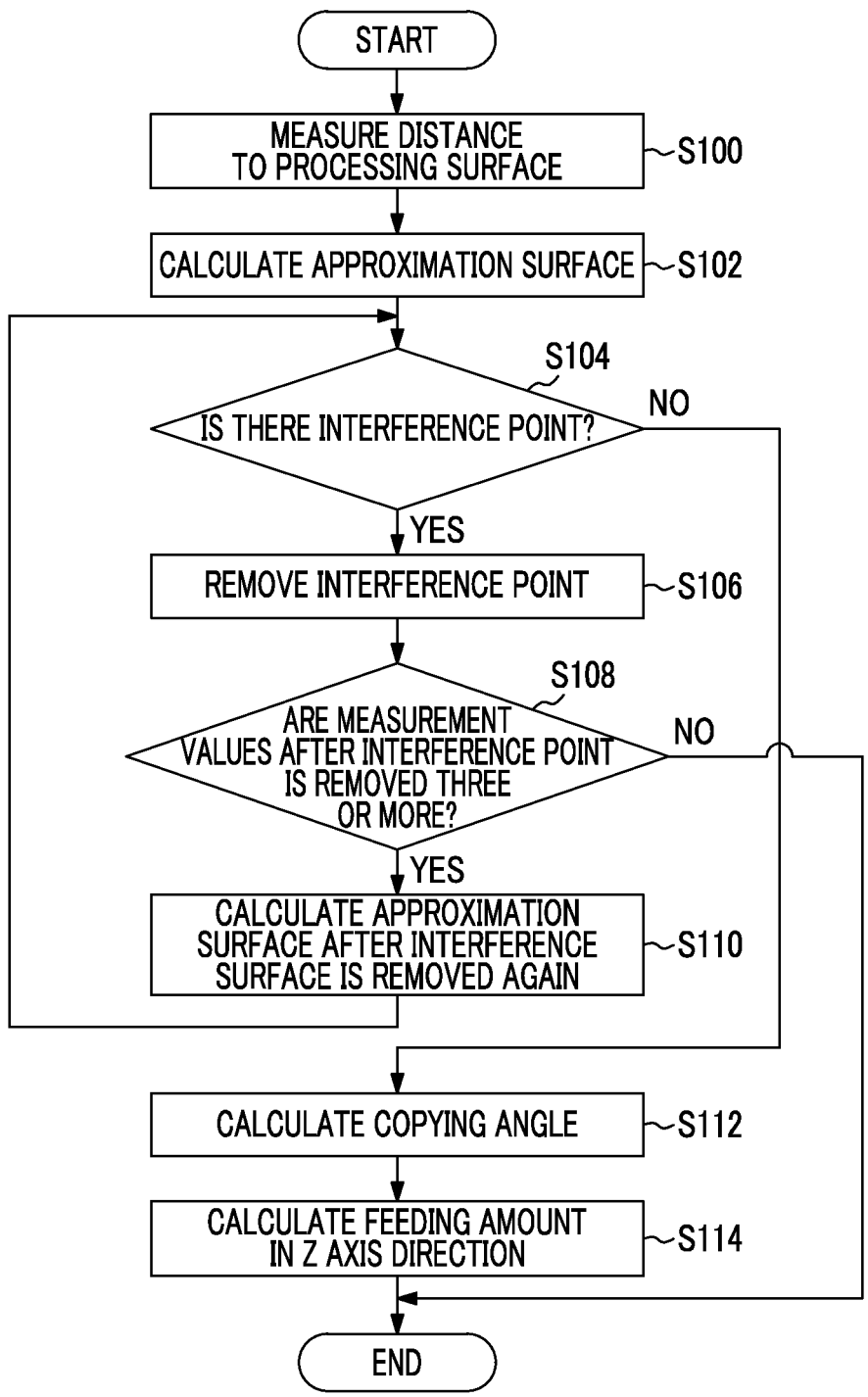

NORMAL-LINE DETECTION DEVICE, PROCESSING DEVICE, AND NORMAL-LINE DETECTION METHOD

RELATED APPLICATIONS

The present application is a National Phase of International Application Number PCT/JP2014/050281, filed Jan. 10, 2014, which claims priority to Japanese Application Number 2013-007784, filed Jan. 18, 2013.

TECHNICAL FIELD

The present invention relates to a normal-line detection device, a processing device, and a normal-line detection method.

BACKGROUND ART

In the related art, as a method for detecting a normal-line direction of a curved surface such as in a processing surface of a three-dimensional work piece, a method disclosed in PTL 1 is known.

In the method disclosed in PTL 1, distance measurement means for measuring at least three positions in the vicinity of a reference point on a curved surface of an object is provided, a virtual plane including each measurement position is set based on each measurement position, and a normal-line direction of the virtual plane is detected.

In the method disclosed in PTL 1, when there is unevenness such as a protrusion or a step on a measuring object, it is not possible to detect a correct normal-line. In addition, in PTL 1, a plane approximation method in a case where four or more measurement positions are used is not specifically disclosed.

Meanwhile, PTL 2 discloses a method in which distance sensors are arranged so as to be deviated by an eccentric amount R in a radial direction from the rotation (processing) center of a measurement axis, the distance sensors are swiveled about the measurement axis, information related to the distance to a continuous measured surface is acquired, and a normal-line is detected by removing a step from the distance information.

CITATION LIST

Patent Literature

[PTL 1] Japanese Unexamined Patent Application Publication No. 3-57910
[PTL 2] Japanese Unexamined Patent Application Publication No. 62-191710

SUMMARY OF INVENTION

Technical Problem

However, in the method disclosed in PTL 2, since it is necessary to dispose a mechanism for rotating the distance sensors or to arrange the distance sensors around the rotation center, there is a problem that a space for arranging a processing machine cannot be ensured. In addition, even when the method disclosed in PTL 2 is applied to the processing machine, there is a problem that sufficient control information for aligning an axis line of a processing shaft of the processing machine with the detected normal-line cannot be obtained.

The present invention is made in consideration of the above-described circumstances, and an object thereof is to provide a normal-line detection device, a processing device, and a normal-line detection method capable of detecting a normal-line direction of a processing surface even when the processing surface is uneven, ensuring space for installing a processing machine, and matching an axis line of a processing shaft to the normal line of the processing surface.

Solution to Problem

In order to achieve the object, a normal-line detection device, a processing device, and a normal-line detection method of the present invention adopt the following means.

According to a first aspect of the present invention, there is provided a normal-line detection device including: four or more distance measurement means for measuring a distance to a processing surface of a work piece, in which the distance measurement means is arranged on the periphery of a processing machine on a plane orthogonal to an axis line of a processing shaft of the processing machine and a measurement axis of each distance measurement means and the axis line of the processing shaft intersect each other; and calculation means for calculating an approximation surface of the processing surface based on a measurement value measured by each distance measurement means and an angle of each distance measurement means with respect to the axis line of the processing shaft and obtaining a normal-line of the approximation surface as a normal-line of the processing surface.

In the normal-line detection device according to the present configuration, four or more distance measurement means are arranged on the periphery of the processing machine. Four or more distance measurement means are arranged on the plane orthogonal to the axis line of the processing shaft of the processing machine, and four or more distance measurement means are arranged so that the measurement axis of each distance measurement means and the axis line of the processing shaft intersect each other. In addition, the processing shaft is a shaft parallel to a z axis, and the axis configuring the plane is an x axis and a y axis.

In addition, the calculation means calculates the approximation surface of the processing surface based on the measurement value measured by each distance measurement means and the angle of each distance measurement means with respect to the axis line of the processing shaft. For example, the angle with respect to the axis line of the processing shaft is an intersection angle between the measurement axis of the distance measurement means and the axis line of the processing shaft, and an arrangement angle of the distance measurement means on the plane orthogonal to the axis line of the processing shaft. Specifically, the arrangement angle is an azimuth angle to the distance measurement means based on a predetermined axis (for example, x axis) on the plane.

Accordingly, if there are at least three or more measurement values measured with the distance measurement means, the calculation means can correctly obtain the approximation surface of the processing surface. In addition, the normal-line of the approximation surface becomes the normal-line of the processing surface.

Moreover, it is possible to calculate the approximation surface of the processing surface if there are three measurement values. However, the present configuration includes four or more distance measurement means. Accordingly, even when there is unevenness such as a step or a protrusion on the processing surface and the distance measurement means is included which measures the distance between the sensor and the unevenness which is not suitable for calculation of the approximation surface, the present configuration including four or more distance measurement means can calculate the approximation surface by removing the measurement value.

In addition, since four or more distance measurement means are arranged on the periphery of the processing machine, space for installing the processing machine is ensured, and it is possible to match the axis line of the processing shaft to the normal-line.

As described above, according to the present configuration, it is possible to detect the normal-line direction of the processing surface even when the processing surface is uneven, to ensure the space for installing the processing machine, and to match the axis of the processing shaft to the normal line of the processing surface.

In the first aspect, preferably, the calculation means determines the measurement value, in which a distance between the approximation surface and the distance measurement means deviates from a predetermined range, measured by the distance measurement means, as the measurement value which is not suitable for calculation of the approximation surface.

According to the present configuration, it is possible to easily determine the measurement value which is not suitable for the calculation of the approximation surface.

In the first aspect, preferably, the predetermined range is set to be great as a curvature of the work piece is increased.

According to the present configuration, since it is possible to prevent the measurement value which is not suitable for the calculation of the approximation surface from being erroneously determined, it is possible to more accurately calculate the approximation surface.

In the first aspect, preferably, the calculation means removes the measurement value which is not suitable for the calculation of the approximation surface and obtains the approximation surface again.

According to the present configuration, it is possible to calculate a more accurate approximation surface without influence of the unevenness of the processing surface.

In the first aspect, preferably, the angle with respect to the axis line of the processing shaft is an intersection angle between the measurement axis of the distance measurement means and the axis line of the processing shaft, and an azimuth angle to the distance measurement means based on a predetermined axis configuring the plane.

According to the present configuration, it is possible to easily calculate the approximation surface more accurately.

According to a second aspect of the present invention, there is provided a processing device, including: a processing machine which processes a work piece; and the above-described normal-line detection device, in which the processing machine and the work piece move relative to each other so that an axis line of a processing shaft of the processing machine is matched to a normal-line detected by the normal-line detection device.

In the second aspect, preferably, after the axis line of the processing shaft is matched to the normal-line of the processing surface, in a state where a tip of the processing machine comes into contact with a processing point with respect to the work piece, measurement of the distance is performed by the distance measurement means, and when deviation in the measurement values of the distance measurement means, in which the measurement value which is not suitable for the calculation of the approximation surface is removed, and is within a predetermined allowable range, processing is performed by the processing machine.

According to the present configuration, it is possible to more accurately perform the processing.

According to a third aspect of the present invention, there is provided a normal-line detection method, including: a first step of arranging four or more distance measurement means on the periphery of a processing machine on a plane orthogonal to an axis line of the processing machine, intersecting a measurement axis of each distance measurement means and an axis line of a processing shaft, and measuring a distance to a processing surface of a work piece; and a second step of calculating an approximation surface of the processing surface based on a measurement value measured by each distance measurement means and an angle of each distance measurement means with respect to the axis line of the processing shaft, and obtaining a normal-line of the approximation surface as a normal-line of the processing surface.

Advantageous Effects of Invention

According to the present invention, it is possible to detect a normal-line direction of a processing surface even when the processing surface is uneven, ensure space for installing a processing machine, and match an axis line of a processing shaft to the normal line of the processing surface.

BRIEF DESCRIPTION OF DRAWINGS

FIG. 7 is a flowchart showing a flow of normal-line detection processing according to the embodiment of the present invention.

DESCRIPTION OF EMBODIMENTS

Hereinafter, an embodiment according to the present invention will be described with reference to the drawings.

Figure 1:
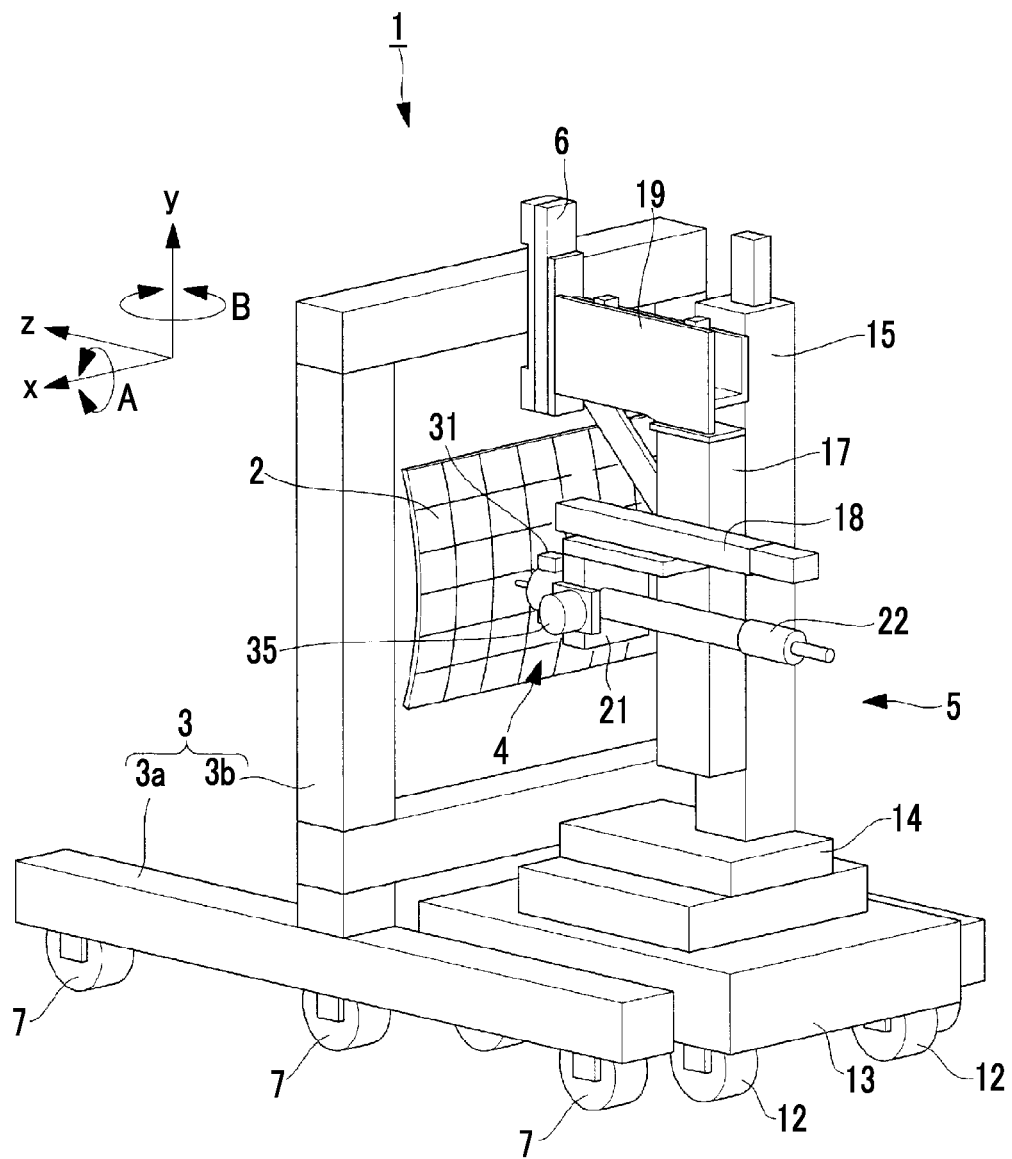
FIG. 1 is a perspective view of a processing device according to an embodiment of the present invention.
Figure 2A:
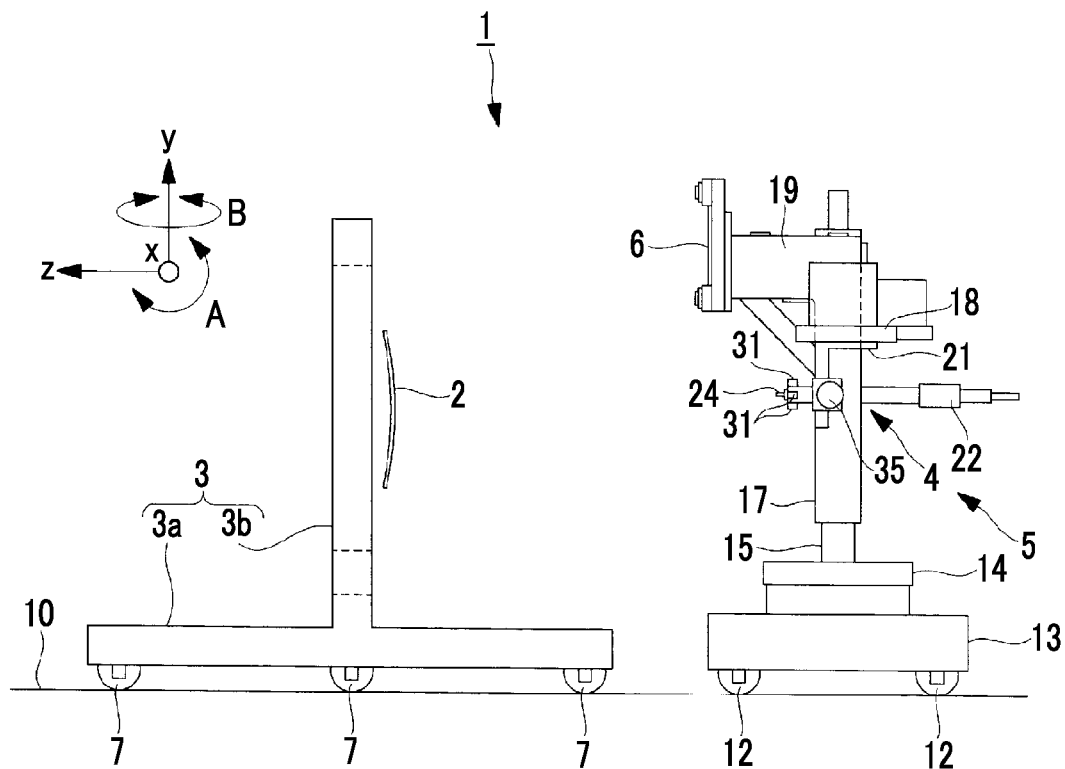
FIG. 2A is a side view of the processing device of the embodiment of the present invention and shows a state where a jig frame and a processing machine support structure are separated from each other.

FIG. 1 is a perspective view of a processing device according to the embodiment. For example, the processing device 1 performs piercing of a curved plate shaped work piece 2, with which a wing, a body, or the like of an aircraft is formed, by a drill. However, the application of the processing device 1 is not limited to the piercing, and the processing device 1 may be applied to other processing such as grinding or riveting, or examination or the like after the processing. FIG. 2 is a side view of the processing device 1. FIG. 2A shows a state where a jig frame 3 and a processing machine support structure 5 are separated from each other, and FIG. 2B shows a state where the jig frame 3 and the processing machine support structure 5 are connected to each other.

Figure 2B:
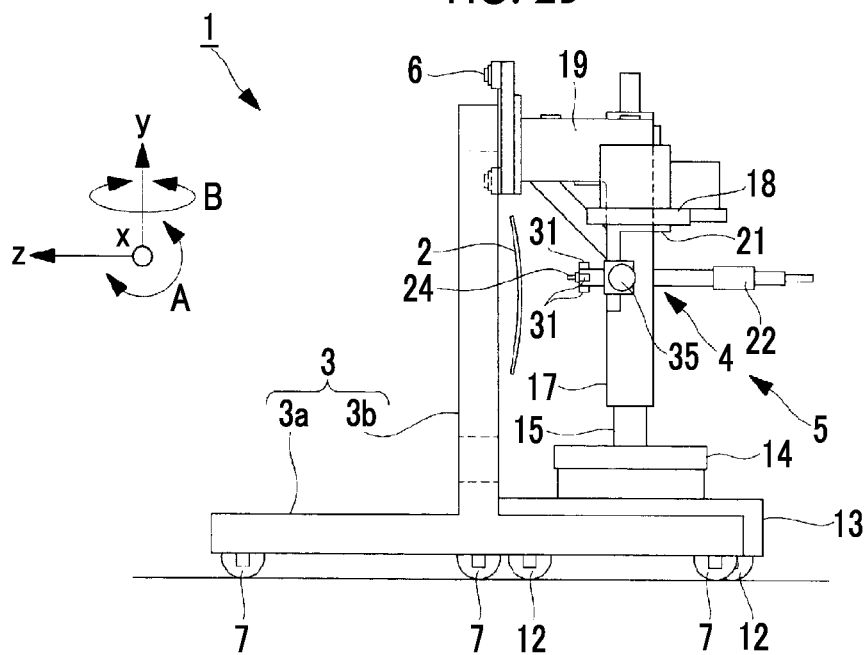
FIG. 2B is a side view of the processing device of the embodiment of the present invention and shows a state where the jig frame and the processing machine support structure are connected to each other.

As shown in FIGS. 1, 2A, and 2B, the processing device 1 includes the jig frame 3 for fixing the work piece 2, and the processing machine support structure 5 which supports a drill unit 4. In addition, the processing device 1 includes a connection portion 6 which detachably connects the jig frame 3 and the processing machine support structure 5. The work piece 2 may be a single-curved surface (single contour), or may be a complex-curved surface (double contour).

For example, the jig frame 3 is configured of a square pipe or the like, and includes a leg portion 3a which is formed in an H shape in a plan view, and a frame body 3b which is vertically erected from the center portion of the leg portion 3a. For example, six caster wheels 7 are provided on the leg portion 3a, and accordingly, the entire jig frame 3 can be freely moved to an installation surface 10 such as a floor of a factory on which the processing device 1 is provided. In addition, for easy explanation, a width direction of the jig frame 3 is referred to as an x axis direction, a vertical direction thereof is referred to a y axis direction, and a horizontal direction orthogonal to the x axis direction is referred to as a z axis direction. In addition, a movement direction around the x axis is referred to an A direction, and a movement direction around the y axis is referred to a B direction.

The frame body 3b of the jig frame 3 has a size which encloses the work piece 2, and the work piece 2 is installed on the frame body 3b in a manner in which the curved surface of the work piece 2 is directed in the z axis direction via a locator (not shown) (holding tool) and chords of the curve are along the y axis direction. In addition, the support aspect of the work piece 2 by the jig frame 3 or the surface direction of the work piece 2 is not limited to this example. In addition, in actuality, an interval between the frame bodies 3 is a wider span than the interval shown in FIG. 1.

Meanwhile, in the processing machine support structure 5, similar to the jig frame 3, a main column portion 15 is vertically erected on a pedestal portion 13 which is freely movable on the installation surface 10 by caster wheels 12 via an x axis slider 14, a z axis slider (coordinate position adjustment portion) is installed on the main column portion 15 via a y axis slider 17 (coordinate position adjustment portion), and the drill unit 4 is attached below the z axis slider 18.

In addition, a horizontal beam member 19 extends in the z axis direction from the vicinity of the upper end of the main column portion 15, and the above-described connection portion 6 is installed on the free end of the horizontal beam member 19. As the specific structure of the connection portion 6, a method of fixing an uneven shape (not shown) formed between the upper portion of the frame body 3b of the jig frame 3 and the structure by faucet fitting, or a method of causing the upper portion to be attached to the structure with a strong electromagnet is considered.

As shown in FIGS. 1 and 2B, the processing machine support structure 5 is correctly positioned by connecting the connection portion 6 to the upper portion of the frame body 3b of the jig frame 3 at a position at which the processing machine support structure 5 is inserted between the H shape of the leg portion 3a of the jig frame 3, and the processing machine support structure 5 is fixed to the jig frame 3. Since the span of the frame body 3b of the jig frame 3 is sufficiently wider than the width of the pedestal portion 13 of the processing machine support structure 5, the processing machine support structure 5 can move in the x axis direction between the frame bodies 3b of the jig frame 3, and the processing of the work piece 2 is performed by changing the connection position of the connection portion 6 along the longitudinal direction (x axis direction) of the work piece 2 attached to the jig frame 3.

In addition, braking means for stopping rolling is attached to the caster wheels 7 and 12, and by releasing brakes from the wheels, the jig frame 3 and the processing machine support structure 5 can move on the installation surface 10 in a state where the jig frame 3 and the processing machine support structure 5 are integrally connected to each other.

The x axis slider 14, the y axis slider 17, and the z axis slider 18 which are the coordinate position adjustment portions of the drill unit 4 cause an axis line of a processing shaft (drill shaft 24 described below) of the drill unit 4 to lead to the work piece 2 in the state where the jig frame 3 and the processing machine support structure 5 are connected to each other by the connection portion 6. In addition, the positions in three directions such as the x axis direction, the y axis direction, and the z axis direction of the drill unit 4 with respect to the pedestal portion 13 can be adjusted.

Figure 3:
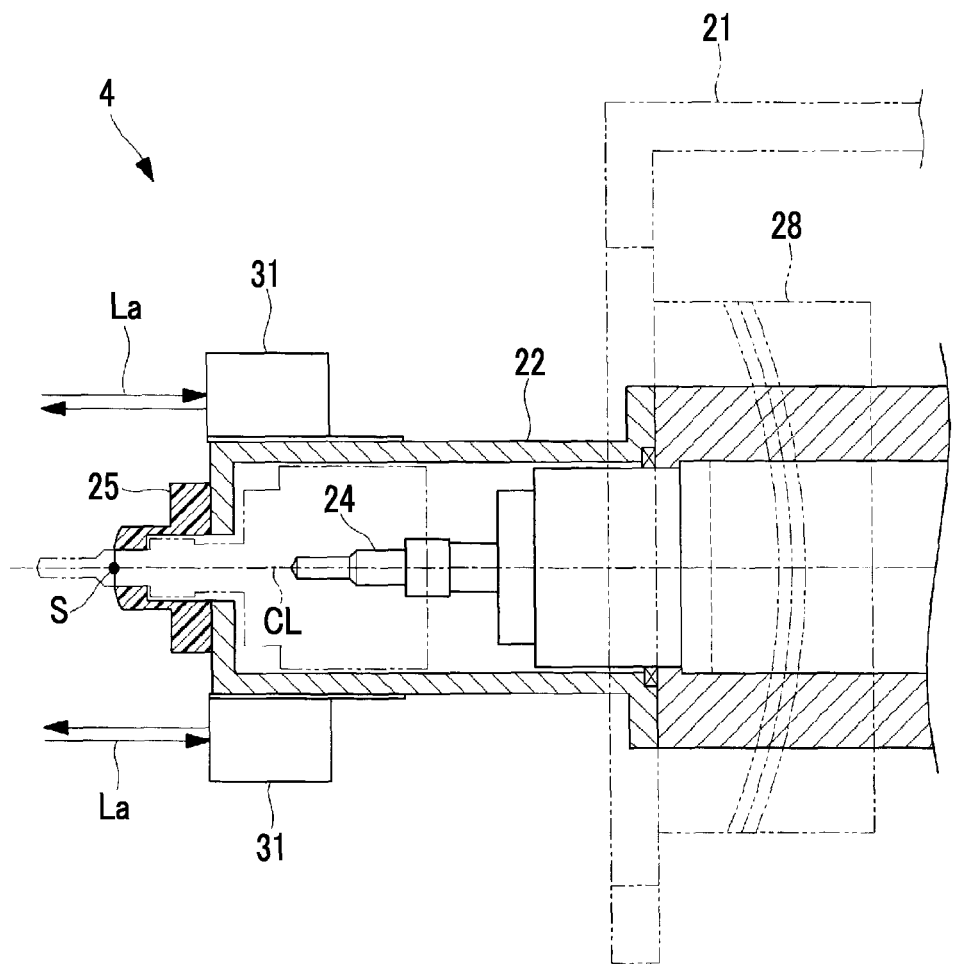
FIG. 3 is a longitudinal cross-sectional view showing a drill unit according to the embodiment of the present invention.

As shown in FIG. 3, the drill unit 4 is attached to an arm member 21 which is formed in an approximately L shape when viewed in the x axis direction so that the rear end side of a drill body 22 which is the processing machine can move up and down in the y direction. The drill body 22 is formed in an approximately cylindrical shape, and includes the drill shaft 24 (processing shaft), and a processing shaft actuator (not shown) which rotates the drill shaft 24 and causes the drill shaft 24 to protrude to the outside from an end piece 25 fixed to the tip surface of the drill body 22 or retracts the drill shaft 24 from the outside. In the processing shaft actuator, a rotating actuator which rotates the drill shaft 24 and a feeding actuator which feeds (protrudes) the drill shaft 24 to the work piece 2 side are integrated with each other. However, the rotating actuator and the feeding actuator may be separate members. The end piece 25 is formed of hard rubber, a resin material, or the like to prevent the damage of the work piece 2 when the end piece 25 comes into contact with the work piece 2.

In addition, if the processing device 1 adopts a method in which a head (the drill unit 4 in the present embodiment) and a work piece (the work piece 2 in the present embodiment) can move relative to each other, as the shape of the processing device 1, the processing device 1 in which the head is a gantry type, a processing device 1 in which a work table on which the work is arranged moves, or the like may be adopted, and thus, the shape of the processing device 1 is not limited to the shape shown in FIG. 1 or the like.

As shown in FIG. 3, the drill body 22 is attached to the inner surface of a vertical wall of the arm member 21 via a pair of arc-shaped rails 28 (the arc-shaped rail is formed by curving a linear rail and is commonly referred to as the GONIO WAY). As shown in FIG. 3, when viewed from the side, a rotation center of the drill body 22 is coincident with a contact point S of the tip portion of the end piece 25 by the arc-shaped rails 28. The contact point S of the end piece 25 is a point which becomes an abutting portion of the end piece 25 abutting the processing point of the work piece 2 when an axial line CL of the drill shaft 24 is positioned along a normal-line NL (refer to FIG. 5) passing through the processing point of the work piece 2. Accordingly, the drill body 22 can rotate in the A direction and the B direction about the contact point S of the end piece 25. In this way, the arc-shaped rails 28 shown in FIG. 3 can rotate the drill body 22 in the A direction. Arc-shaped rails 28 (not shown) for rotating the drill body 22 in the B direction are provided to be orthogonal to the arc-shaped rails 28 shown in FIG. 3.

In addition, the processing device 1 includes a braking portion 35 which fixes the angle of the drill body 22. The structure of the braking portion 35 is not particularly limited as long as the braking portion can tightly fix the angle of the drill body 22.

As instruments configuring a normal-line detection device 50, four or more non-contacting distance sensors 31 are arranged on the periphery of the drill body 22 in the processing device 1. Each of the non-contacting distance sensors 31 measures a distance from the sensor to a processing surface 56 of the work piece 2. In this way, since the non-contacting distance sensors 31 are arranged on the periphery of the drill body 22, space for installing the drill body 22 is ensured.

In addition, for example, as the non-contacting distance sensor 31, a laser distance sensor is suitable, which receives the reflection of laser light La and measures the distance from the sensor to the processing surface 56 of the work piece 2.

Figure 4:
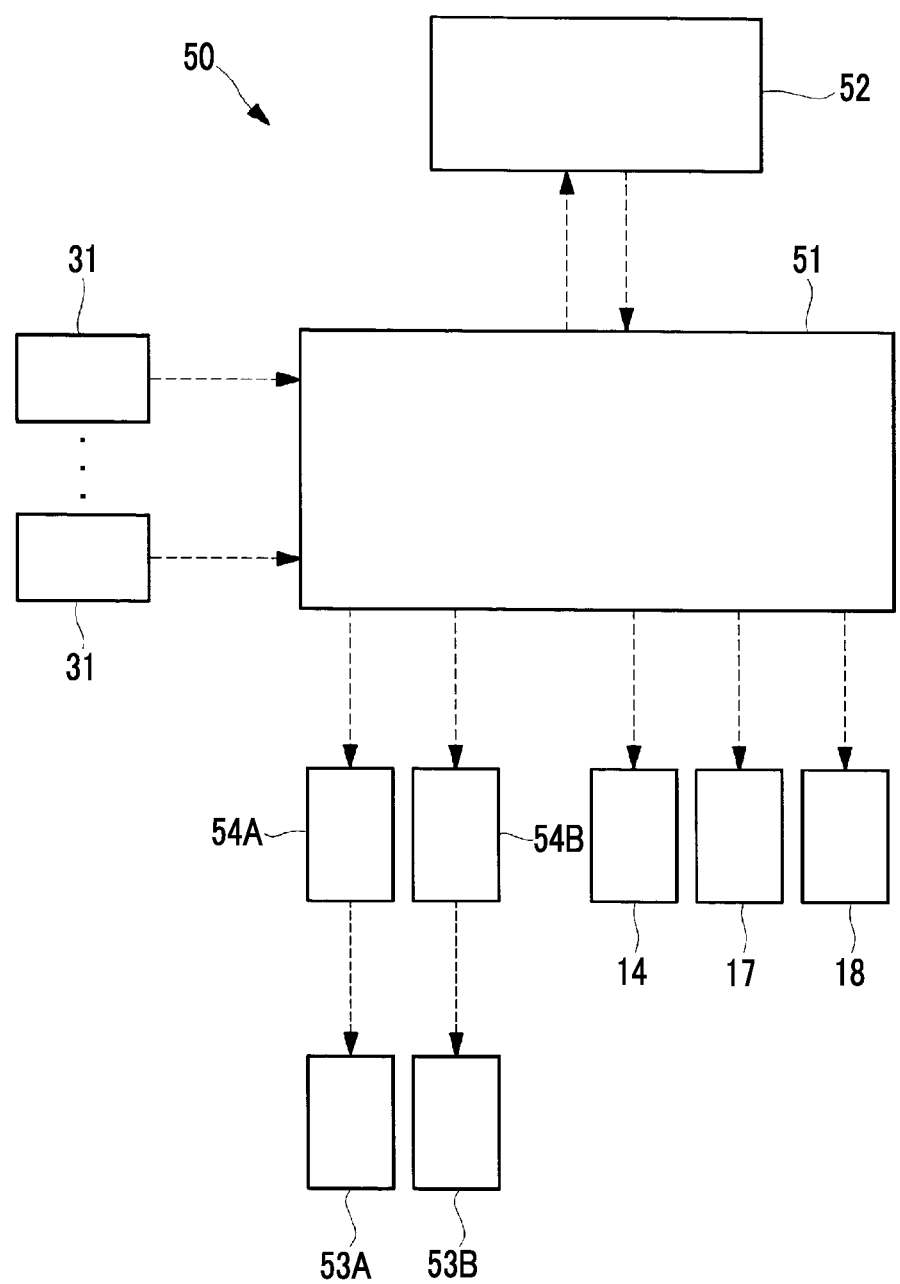
FIG. 4 is a block diagram showing an electric configuration of a normal-line detection device according to the embodiment of the present invention.

FIG. 4 is a block diagram showing an electrical configuration of the normal-line detection device 50 according to the embodiment.

As shown in FIG. 4, for example, the normal-line detection device 50 includes a controller 51 which is a programmable logic controller (PLC).

The measurement values measured by the non-contacting distance sensors 31 are input to the controller 51, and the controller 51 outputs the measurement values to a Personal Computer (PC) 52. The PC 52 calculates the normal-line NL of the processing surface 56 penetrating the processing point of the work piece 2 based on the input measurement values. In addition, the PC 52 calculates copying angles α and β with respect to the A direction and the B direction of the drill shaft 24 so that the axis line CL of the drill shaft 24 is matched to the normal-line NL. In addition, the normal-line detection device 50 may not include the PC 52, and the controller 51 may have a calculation function for the copying angles α and β which is performed by the PC 52.

The copying angles α and β which are calculated by the PC 52 are output to the controller 51.

The copying angle α input to the controller 51 is output to a controller 54A of a motor 53A for rotating the drill body 22 in the A direction along the arc-shaped rails 28. In addition, the copying angle β input to the controller 51 is output to a controller 54B of a motor 53B for rotating the drill body 22 in the B direction along the arc-shaped rails 28.

If the copying angles α and β are input to the controllers 54A and 54B, the controllers 54A and 54B drive the motors 53A and 53B according to the copying angles α and β. Accordingly, the angle of the axis line CL of the drill shaft 24 is changed, and thus, the axis line CL is matched to the normal-line NL.

In addition, the controller 51 is connected to actuators (not shown) for moving the x axis slider 14, the y axis slider 17, and the z axis slider 18, and various control signals are input to and output from the controller 51.

Figure 5:
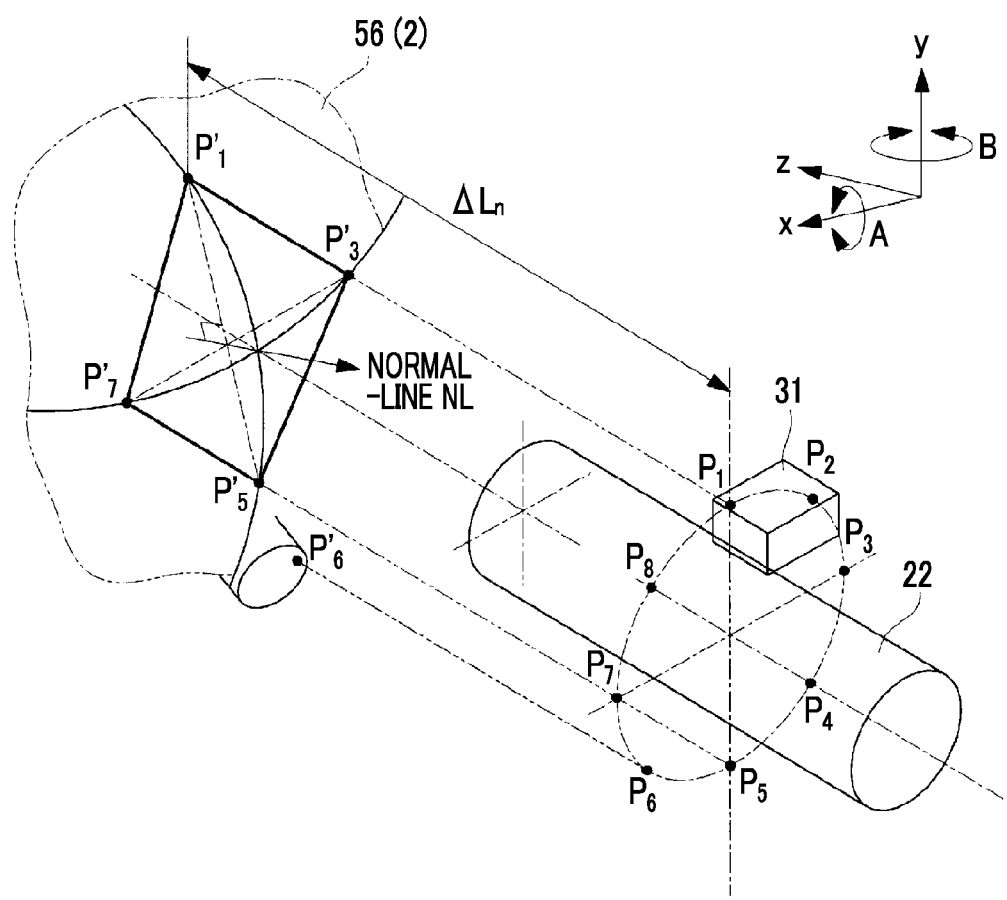
FIG. 5 is a schematic view showing an outline of a normal-line detection method according to the embodiment of the present invention.

FIG. 5 is a schematic view showing an outline of a normal-line detection method according to the present embodiment.

As an example, FIG. 5 shows a case where the normal-line detection device 50 includes eight non-contacting distance sensors 31, and positions shown by $P_n$ indicate the arrangement positions (light source points) of the non-contacting distance sensors 31. Moreover, the measurement positions measured by the non-contacting distance sensors 31 are shown by $P'_n$. The non-contacting distance sensors 31 measure a distance $\Delta L_n$ from the sensors to the processing surface 56 of the work piece 2. Moreover, n is a number for specifying the non-contacting distance sensor 31 and is any of 1 to 8 in the example of FIG. 5.

The PC 52 included in the normal-line detection device 50 calculates an approximation surface of the processing surface 56 using the measurement value $\Delta L_n$ measured by the non-contacting distance sensors 31, and obtains the normal-line NL of the approximation surface as the normal-line of the processing surface 56.

However, for example, as a measurement position $P'_6$, the distance from the sensor to a step or a protrusion of the processing surface 56 may be measured. As the step or the protrusion, there is a jig, a jig pin, a hole which is open to the processing surface 56 in advance, or the like. Since the measurement value from the sensor to unevenness such as the step or the protrusion is the value which is measured in a state where an optical axis of the non-contacting distance sensor 31 interferes with the unevenness, the measurement value is not suitable for the calculation of the approximation surface.

Accordingly, in the normal-line detection method according to the present embodiment, the approximation surface is calculated by removing the measurement value (hereinafter, referred to an "interference point") which is not suitable for the calculation of the approximation surface.

Figure 6:
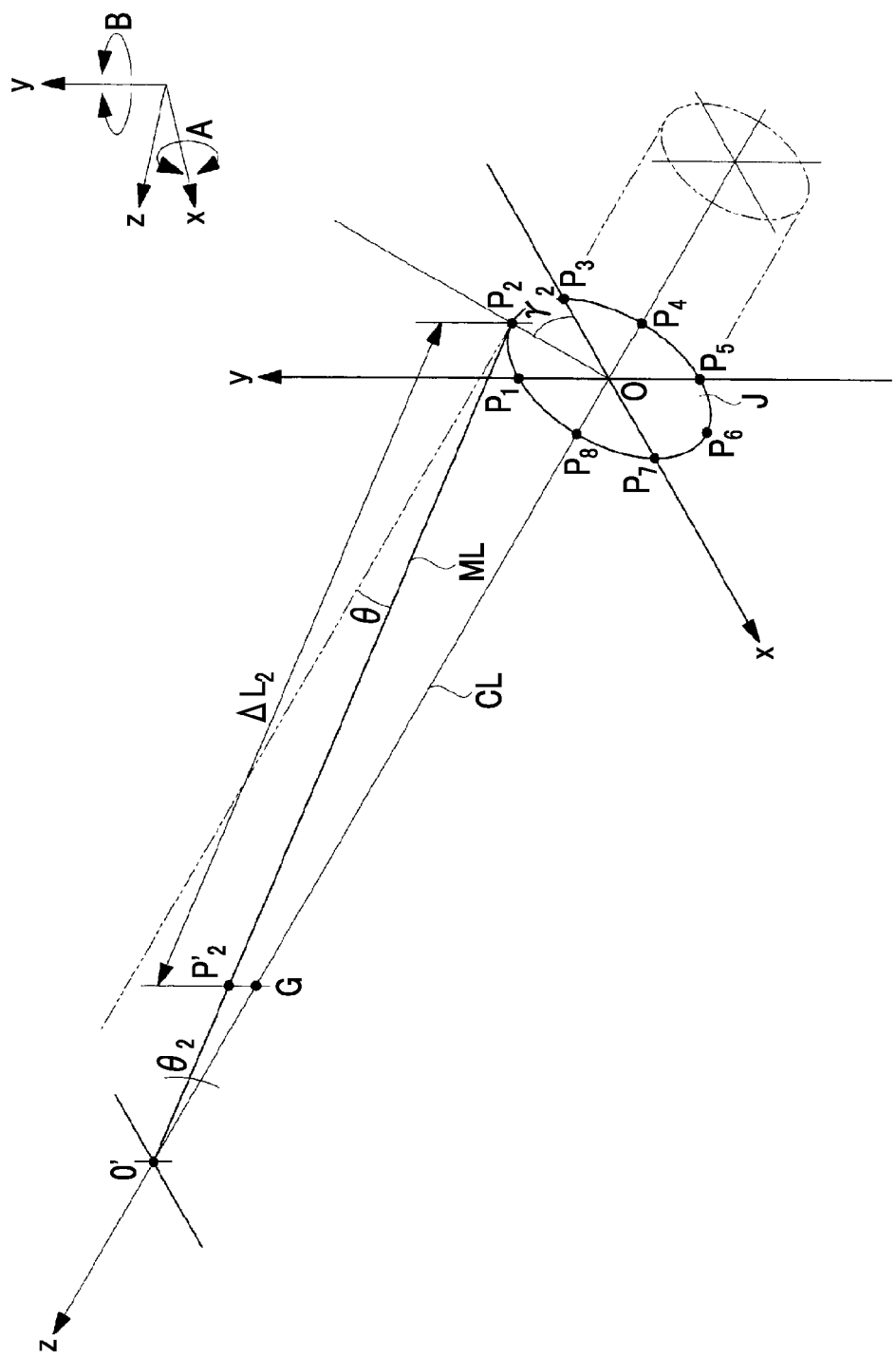
FIG. 6 is a schematic view showing details of arrangement positions of non-contacting distance sensors according to the embodiment of the present invention.

FIG. 6 is a schematic view showing details of arrangement positions $P_n$ of non-contacting distance sensors 31.

The non-contacting distance sensors 31 are arranged on a plane (hereinafter, referred to as an "arrangement plane") J orthogonal to the axis line CL of the drill body 22 on the periphery of the drill body 22.

In addition, for simplification in the following explanation, a case where the axis line CL is parallel with the z axis and the axis configuring the arrangement plane J is parallel with the x axis and the y axis will be described as an example.

In addition, the non-contacting distance sensors 31 are arranged so that each distance measurement axis ML and the axis line CL intersect each other at an intersection angle $\theta_n$. In addition, preferably, distance measurement axes ML of the non-contacting distance sensors 31 converge at a convergent point O' inside a processing point G.

Moreover, the arrangement angle $\gamma_n$ of the non-contacting distance sensor 31 on the arrangement plane J is defined as an azimuth angle from a predetermined axis (for example, the x axis) configuring the arrangement plane J to the non-contacting distance sensor 31.

FIG. 7 is a flowchart showing the flow of the normal-line detection processing according to the present embodiment. In addition, the normal-line detection processing is performed by the normal-line detection device 50 whenever the processing is performed on the work piece 2.

First, in Step 100, the controller 51 outputs the control signal for measuring the distance from each of the non-contacting distance sensors 31 to the processing surface 56 with respect to the non-contacting distance sensor 31. In addition, the controller 51 outputs the measurement value measured by the non-contacting distance sensor 31 to the PC 52.

In the next Step S102, the PC52 calculates the approximation surface using the measurement value.

More specifically, the PC 52 calculates the approximation surface of the processing surface 56 based on the measurement value measured by each non-contacting distance sensor 31 and the angle of each non-contacting distance sensor 31 with respect to the axis line CL. In addition, the angle with respect to the axis line CL indicates the intersection angle $\theta_n$ and the arrangement angle $\gamma_n$ of each non-contacting distance sensor 31. As described below, the coordinate of the measurement position $P'_n$ is obtained using the intersection angle $\theta_n$ and the azimuth angle $\gamma_n$, the approximation surface is calculated, and thus, it is possible to easily calculate the approximation surface accurately.

The following Expression (1) is an expression for obtaining the coordinate $(x'_n, y'_n, z'_n)$ of the measurement position $P'_n$ on the processing surface 56 using the measurement value measured by the non-contacting distance sensor 31. In addition, in Expression (1), $x_n$, $y_n$, and $z_n$ are coordinates showing the light source point of the nth non-contacting distance sensor 31, that is, the arrangement position $P_n$.

[Expression 1]

$$x_n' = x_n + \Delta L_n \cos \theta_n \times \cos \gamma_n$$

$$y_n' = y_n + \Delta L_n \cos \theta_n \times \sin \gamma_n$$

$$z_n' = x_n + \Delta L_n \sin \theta_n \qquad (1)$$

Next, an example of a method of calculating the approximation surface of the processing surface 56 using the coordinate $(x'_n, y'_n, z'_n)$ of the processing surface 56 calculated by Expression (1) will be described. In addition, in the present embodiment, as an example, a plane approximation is performed. However, the present invention is not limited to this, and the approximation of the processing surface 56 may be performed by other methods such as collinear approximation, circular approximation, spherical approximation, or free-curved surface approximation.

In addition, when the interference point is greatly deviated from the processing surface 56, accuracy of the approximation surface may extremely deteriorate. Accordingly, in this case, preferably, the approximation surface is calculated using a method such as a robust estimation method.

The following Expression (2) is an expression which is defined as a general expression of a plane. In addition, in Expression (2), a, b, and c are unknown numbers.

[Expression 2]

$$z = ax + by + c \qquad (2)$$

In addition, in order to minimize the sum of squares from each $z_i$, a deviation square-sum S is defined as the following Expression (3). That is, in the conditions in which the deviation square-sum S is minimum, minimum errors are generated, and the plane approximates the processing surface 56.

[Expression 3]

$$S(a, b, c) = e_i = \sum_{i=1}^{n} [z_i - (ax_i + by_i + c)^2] = 0 \qquad (3)$$

If partial differentiation is performed on the deviation square-sum S using unknown numbers a, b, and c, a simultaneous equation expressed in the following Expression (4) is obtained.

[Expression 4]

$$\frac{\partial e_i}{\partial a} = -\sum_{i=1}^{n} xz + a\sum_{i=1}^{n} x^2 + b\sum_{i=1}^{n} xy + c\sum_{i=1}^{n} x = 0 \qquad (4)$$

$$\frac{\partial e_i}{\partial b} = -\sum_{i=1}^{n} yz + a\sum_{i=1}^{n} xy + b\sum_{i=1}^{n} y^2 + c\sum_{i=1}^{n} y = 0$$

$$\frac{\partial e_i}{\partial c} = -\sum_{i=1}^{n} z + a\sum_{i=1}^{n} x + b\sum_{i=1}^{n} y + c = 0$$

Since three equations are obtained with respect to the unknown numbers a, b, and c, the unknown numbers a, b, and c are obtained by solving Expression (4) as expressed by the following Expression (5), and the approximation plane is defined.

[Expression 5]

$$\begin{pmatrix} a \\ b \\ c \end{pmatrix} = \begin{bmatrix} \sum_{i=1}^{n} x^2 & \sum_{i=1}^{n} xy & \sum_{i=1}^{n} x \\ \sum_{i=1}^{n} xy & \sum_{i=1}^{n} y^2 & \sum_{i=1}^{n} y \\ \sum_{i=1}^{n} x & \sum_{i=1}^{n} y & 1 \end{bmatrix}^{-1} \begin{pmatrix} \sum_{i=1}^{n} xz \\ \sum_{i=1}^{n} yz \\ \sum_{i=1}^{n} z \end{pmatrix} \qquad (5)$$

In the next Step 104, the PC 52 determines whether or not the interference point exists, and when the interference point exists, the step proceeds to Step 106. On the other hand, when interference point does not exist, since the approximation surface is determined, the step proceeds to Step 112.

In addition, the PC 52 according to the present embodiment determines the measurement value measured by the non-contacting distance sensor 31, in which the distance between the approximation surface and the arrangement position $P_n$ of the non-contacting distance sensor 31 is deviated from a predetermined range (hereinafter, referred to as an "non-interference range"), as the interference point.

An example of a method of determining a specific interference point will be described below.

When the approximation surface is set to a plane, the general expression of the approximation plane is defined as the following Expression (6) by rearranging Expression (2).

$$ax + by - z + c \neq 0 \qquad \text{[Expression 6]}$$

Accordingly, a distance $h_n$ between the approximation plane and the arrangement position $(x_n, y_n, z_n)$ of the non-contacting distance sensor 31 in the normal-line direction of the approximation plane is defined as the following Expression (7).

[Expression 7]

$$h_n = \frac{|ax_n + by_n + z_n + c|}{\sqrt{a^2 + b^2 + 1}} \quad (7)$$

Moreover, the measurement value, in which the distance $h_n$ is deviated from the preset non-interference range, is determined as the interference point.

In addition, the non-interference range is greatly set as a curvature of the work piece 2 is increased.

Figure 8A:
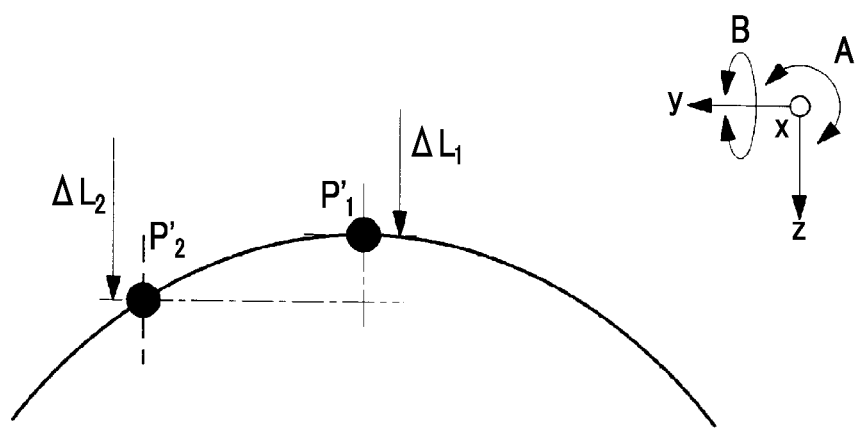
FIG. 8A is a schematic view showing a relationship between a curvature and a measurement position of a work piece according to the embodiment of the present invention, and shows the measurement position of the work piece having a small curvature.
Figure 8B:
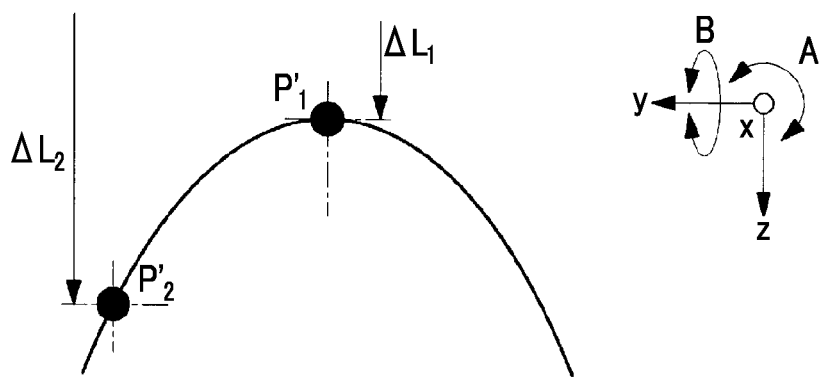
FIG. 8B is a schematic view showing the relationship between the curvature and the measurement position of the work piece according to the embodiment of the present invention, and shows the measurement position of the work piece having a great curvature.

The reason will be described with reference to FIG. 8 showing a relationship between the curvature of the work piece 2 and the measurement position $P'_n$. FIG. 8A shows the measurement position $P'_n$ of the work piece 2 having a small curvature, and FIG. 8B shows the measurement position $P'_n$ of the work piece 2 having a great curvature.

In regard to the distance $\Delta L_2$ at the measurement position $P'_2$, even when the arrangement positions $P_n$ of the non-contacting distance sensors 31 are the same as each other, as shown in FIG. 8B, the difference between distances $\Delta L_n$ may be increased as the curvature is increased.

Accordingly, if the same non-interference range as the case where the curvature is small is used even when the curvature of the work piece 2 is increased, the measurement value in which the distance from the sensor to the processing surface 56 is measured may be determined as the interference point.

Accordingly, in the present embodiment, the non-interference range is greatly set as the curvature of the work piece 2 is increased. Therefore, since the measurement value which is not suitable for the calculation of the approximation surface is prevented from being erroneously determined, it is possible to more accurately calculate the approximation surface.

For example, the non-interference range which becomes a reference is calculated based on a curvature radius of the work piece 2 which is input in advance, and may be calculated by performing weighting based on at least any one of the measured distance of the work piece 2, the angle of the work piece 2, the input surface quality of the work piece 2, or the like.

In addition, when the distance between the processing point G and the non-contacting distance sensor is great, since the difference of the measurement distances for each non-contacting distance sensor 31 is increased even when the curvatures are the same as each other, it is necessary to set the non-interference range to be great.

In addition, also in a case where the measurement accuracy of the non-contacting distance sensor 31 deteriorates, it is necessary to set the non-interference range to be great. For example, since the measurement accuracy deteriorates when the processing surface 56 is a glossy surface or when the angle between the optical axis of the non-contacting distance sensor 31 and the processing surface 56 is great, the non-interference range is set to be great, and thus, erroneous detection of the reference point is prevented.

However, it is important to satisfy predetermined angle accuracy in addition to the above-described conditions in the setting of the non-interference range. That is, various optimum conditions are set so that the erroneous detection of the interference point is prevented and the predetermined angle accuracy is satisfied.

In Step 106, the interference point is removed from the measurement values measured by the non-contacting distance sensors 31.

In the next Step 108, it is determined whether or not the number of the measurement values after the interference point is removed is three or more. The reason for determination is because the surface cannot be specified by two measurement values and at least three measurement values are required in order to accurately obtain the approximation surface of the processing surface 56. In Step 108, when the number of the measurement values is three or more, the step proceeds to Step 110, and when the number of the measurement values is not three or more, since it is not possible to calculate the approximation surface, the normal-line detection processing ends, and error processing is performed.

In Step 110, the approximation surface is calculated again using the measurement values in which the interference point is removed.

It is possible to calculate the approximation surface of the processing surface 56 if there are three measurement values. However, the processing device 1 according to the present embodiment includes four or more non-contacting distance sensors 31. Accordingly, even when there is unevenness such as the step or the protrusion on the processing surface 56 and there is the non-contacting distance sensor 31 which measures the distance between the sensor and the unevenness which is not suitable for the calculation of the approximation surface, the processing device 1 according to the present embedment including four or more non-contacting distance sensors 31 can calculate the approximation surface by removing the measurement value.

Therefore, in the normal-line detection processing, it is possible to calculate a more accurate approximation surface without influence of the unevenness of the processing surface 56.

In the normal-line detection processing, after the approximation surface is calculated in Step 110, the step returns to Step 104, and thus, it is determined whether or not the interference point exists again.

When it is determined that the interference point does not exist in Step 104, the step proceeds to Step 112, and in Step 112, the PC 52 calculates the copying angles $\alpha$ and $\beta$ and outputs the calculated copying angles $\alpha$ and $\beta$ to the controller 51. In addition, the controller 51 outputs the copying angles $\alpha$ and $\beta$ to controllers 54A and 54B.

The controllers 54A and 54B drive the motors 53A and 53B so that the drill body 22 moves by an amount according to the copying angles $\alpha$ and $\beta$, and matches the axis line CL of the drill shaft 24 to the normal-line NL.

A specific calculation method of the copying angles $\alpha$ and $\beta$ is as follows.

A normal-line vector of the approximation surface is defined as the following Expression (8).

[Expression 8]

$$\vec{a} = \begin{pmatrix} a \\ b \\ -1 \end{pmatrix} \quad (8)$$

Figure 9:
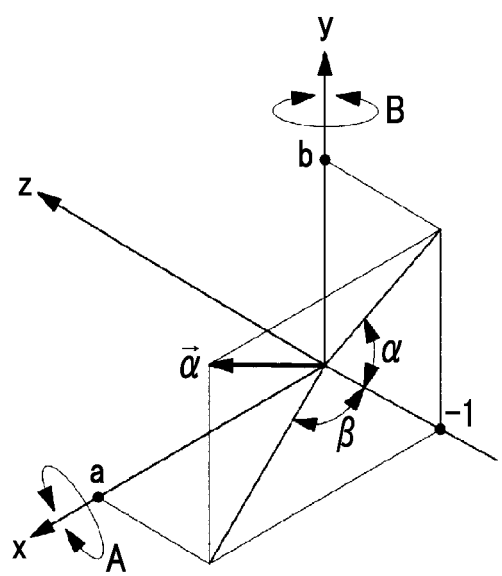
FIG. 9 is a schematic view showing a copying angle α of an A axis and a copying angle β of a B axis according to the embodiment of the present invention.

Accordingly, as shown in a schematic view of FIG. 9, the copying angle α in the A direction and the copying angle β in the B direction are defined as the following Expression (9).

[Expression 9]

$$\alpha = \tan^{-1}(-b)$$

$$\beta = \tan^{-1}(-a) \quad (9)$$

In the next step 114, the controller 51 calculates the feeding amount of the drill body 22 in the z axis direction based on the measurement value to allow the drill body 22 to approach the processing surface 56, and drives the z axis slider 18. If the z axis slider 18 is driven, the contact point S of the end piece 25 which is provided on the tip of the drill body 22 abuts the processing point G of the work piece 2. In this case, the z axis slider 18 is driven, and thus, the end piece 25 is pressed to the work piece 2 by an appropriate abutting force. At this time, preferably, the abutting force is set to the magnitude of a force which exceeds a processing reaction force of the work piece 2 and does not deform the work piece 2. Accordingly, it is possible to prevent the contact point S of the end piece 25 from being deviated from the processing contact position P of the work piece 2. In this way, the contact point S on the tip of the drill body 22 is pressed to the processing point G by the force generated by the driving of the z axis slider 18.

In addition, the processing with respect to the processing point G is performed by the drill shaft 24 in which the axis line CL is matched to the normal-line NL.

In addition, preferably, in the state where the contact point S on the tip of the drill body 22 comes into contact with the processing point G, the measurement of the distance is performed by the non-contacting distance sensors 31 again, and when the deviation in the measurement values of the non-contacting distance sensors 31 in which the interference point is removed is within a predetermined allowable range, the processing is performed. Therefore, it is possible to more accurately perform the processing.

As described above, the normal-line detection device 50 according to the present embodiment includes: four or more non-contacting distance sensors 31 for measuring the distance to the processing surface 56 of the work piece 2, the non-contacting distance sensors 31 being arranged on the periphery of the drill body 22, in the arrangement plane J orthogonal to the axis line CL of the drill body 22, and the distance measurement axis ML of each non-contacting distance sensor and the axis line CL intersecting; and the PC 52 for calculating the approximation surface of the processing surface 56 on the basis of measurement values from the non-contacting distance sensors 31 and the angle of the non-contacting distance sensors 31 with respect to the axis line CL, and determining the normal-line of the approximation surface as the normal-line of the processing surface 56.

Therefore, according to the normal-line detection device 50 of the present embodiment, it is possible to detect the normal-line direction of the processing surface even when the processing surface 56 is uneven, to ensure space for installing the drill body 22, and match the axis line CL of the drill body 22 to the normal line of the processing surface 56.

Hereinbefore, the present invention is described with reference to the embodiment. However, the technical scope of the present invention is not limited to the scope described in the embodiment. Various modifications and improvements can be applied to the embodiment within a scope which does not depart from the gist of the present invention, and aspects in which the modifications and improvements are applied are also included in the technical scope of the present invention.

For example, in the embodiment, the aspect in which the distance measurement means for measuring the distance to the processing surface 56 of the work piece 2 is the non-contacting distance sensor 31 is described. However, the present invention is not limited to this, and an aspect may be also adopted, in which the distance measurement means is other sensors such as a contacting distance sensor in which touch sensors are arranged on the tip of the contact point.

Moreover, in the embodiment, the aspect is described in which the drill body 22 is moved to the work piece 2 so that the axis line CL of the drill body 22 is matched to the normal-line NL detected by the normal-line detection device 50. However, the present invention is not limited to this, and the drill body 22 and the work piece 2 may move relative to each other, and an aspect in which the work piece 2 is moved to the drill body 22, or an aspect in which the drill body 22 and the work piece 2 are moved together may be adopted.

In addition, in the embodiment, the aspect is described, in which the angle of the drill shaft 24 with respect to the axis line CL is changed by driving the motors 53A and 53B. However, the present invention is not limited to this, and an aspect may be adopted, in which the angle of the drill shaft 24 with respect to the axis line CL is changed by other actuators such as an air cylinder.

Moreover, the flow of the normal-line detection processing described in the embodiment is an example, and accordingly, within a scope which does not depart from the gist of the present invention, unnecessary steps may be removed, new steps may be added, and the processing order may be changed.

The invention claimed is:

1. A normal-line detection device comprising:
    four or more distance measurement means for measuring a distance to a processing surface of a work piece, in which the distance measurement means are arranged on a periphery of a processing machine on a plane orthogonal to an axis line of a processing shaft of the processing machine and a measurement axis of each distance measurement means and the axis line of the processing shaft intersect each other; and
    calculation means for calculating an approximation surface of the processing surface based on a measurement value measured by each distance measurement means and an angle of each distance measurement means with respect to the axis line of the processing shaft and obtaining a normal-line of the approximation surface as a normal-line of the processing surface,
    wherein the calculation means determines a measurement value, in which a distance between the approximation surface and the distance measurement means is deviated from a predetermined range, measured by the distance measurement means, as a measurement value which is not suitable for calculation of the approximation surface.

2. The normal-line detection device according to claim 1, wherein the predetermined range is made larger as a curvature of the work piece is increased.

3. The normal-line detection device according to claim 1, wherein the calculation means removes the measurement value which is not suitable for the calculation of the approximation surface and obtains the approximation surface again.

4. The normal-line detection device according to claim 1, wherein the angle of each distance measurement means with respect to the axis line of the processing shaft is an intersection angle between the measurement axis of the respective distance measurement means and the axis line of the processing shaft, and an azimuth angle to the respective distance measurement means based on a predetermined axis configuring the plane.

5. A processing device, comprising:
a processing machine which processes a work piece; and
the normal-line detection device according to claim 1, wherein the processing machine and the work piece move relative to each other so that an axis line of a processing shaft of the processing machine is matched to a normal-line detected by the normal-line detection device.

6. The processing device according to claim 5, wherein after the axis line of the processing shaft is matched to the normal-line of the processing surface, in a state where a tip of the processing machine comes into contact with a processing point with respect to the work piece, measurement of the distance is performed by the distance measurement means, and when deviation in the measurement values of the distance measurement means, in which the measurement value which is not suitable for the calculation of the approximation surface is removed, and is within a predetermined allowable range, processing is performed by the processing machine.

7. A normal-line detection method, comprising:
a first step of arranging four or more distance measurement means on the periphery of a processing machine on a plane orthogonal to an axis line of the processing machine, intersecting a measurement axis of each distance measurement means and an axis line of a processing shaft, and measuring a distance to a processing surface of a work piece; and
a second step of calculating an approximation surface of the processing surface based on a measurement value measured by each distance measurement means and an angle of each distance measurement means with respect to the axis line of the processing shaft, and obtaining a normal-line of the approximation surface as a normal-line of the processing surface,
wherein in the second step, a measurement value, in which a distance between the approximation surface and the distance measurement means is deviated from a predetermined range, measured by the distance measurement means, is determined as a measurement value which is not suitable for calculation of the approximation surface.

* * * * *